J. R. COLT.
CULTIVATOR TEETH.
No. 188,004. Patented March 6, 1877.
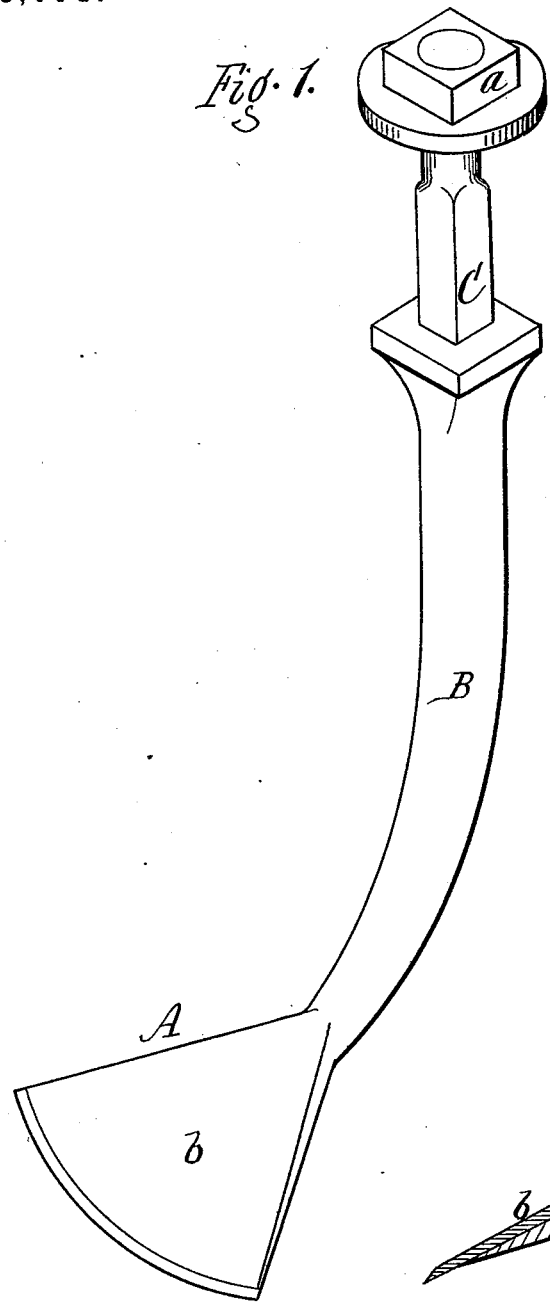
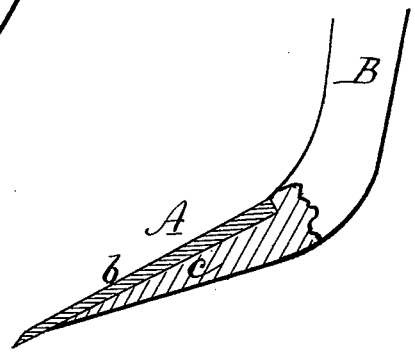

UNITED STATES PATENT OFFICE.

JOSEPH R. COLT, OF LYNDONVILLE, NEW YORK.

IMPROVEMENT IN CULTIVATOR-TEETH.

Specification forming part of Letters Patent No. 188,004, dated March 6, 1877; application filed October 17, 1876.

*To all whom it may concern:*

Be it known that I, JOSEPH R. COLT, of Lyndonville, in the county of Orleans and State of New York, have invented certain new and useful Improvement in Cultivator-Teeth; and I do hereby declare that the following is a full, clear, and exact description of the construction and operation of the same, reference being had to the accompanying drawings, in which—

Figure 1 is a perspective view. Fig. 2 is a vertical section.

My improvement relates to the peculiar form of the tooth, as hereinafter more fully described.

A is the tooth. B is the shank, which is made of curved form, and is secured to the frame by means of a shouldered stem, C, on top of which is secured a nut, $a$. The tooth or blade A is in the form of an equilateral triangle, broadest at its cutting-edge, and tapering back to the shank, where it curves to a point. This edge is convex in outline, and is ground off or sharpened to cut easily. The upper surface is formed with a thin plate of steel, $b$, which extends from the cutting-edge to the base at its junction with the shank. The bottom $c$ of the tooth is iron and tapers to near the cutting-edge, being very thin at that point. The steel is simply welded to the iron, and covers the whole upper surface of the tooth. The size of the tooth is preferably about three inches wide on each side, but may be varied to suit convenience. It stands at a slight upward inclination, as shown in Fig 2, to allow the dirt to pass easily over without clogging and without much resistance. These teeth are attached to the cultivator in the ordinary manner, but in such numbers that they will slightly overlap in the line of cut, so as to act upon the whole surface of the ground. They are designed to furnish a large number of fine cutting-edges, which will cut up all the weeds and discharge them over the rear, and at the same time will thoroughly pulverize the soil without cutting too deep. The great objection to ordinary cultivator-teeth is, that they are too large and bury the weeds, also turn over or invert the soil. Most of such teeth are of wing or mold board form, in which case they act like a plow, inverting the soil, covering the weeds, and injuring small and tender plants. Where harrow-pointed teeth are used they simply drag through without cutting the weeds and frequently clog. My invention furnishes a large number of small cutting-edges, which pass lightly through the soil, cutting up all the weeds, throwing them over upon the surface, leaving the ground smooth, light, and level, and with proper care running close to the roots of plants without injuring them in the least. The triangular form of the tooth is such as to allow free backward passage of the dirt, and the shank at the junction is made oval or sharp to present no impediment. This tooth differs from others in presenting the wide edge to the cut and the narrow tapered end to the shank. Ordinary teeth are just the reverse, presenting the pointed end in front and the wide edge at the rear. Another advantage of the tooth is the convex cutting-edge, which insures a better cutting action, and also prevents clogging by sliding all impediments on one side or the other.

The steel plate on top insures long wear of the tooth and gives a smooth surface, which insures a ready discharge over the top. It is also self-sharpening, the iron wearing away from the bottom as fast as the cutting-edge, thereby leaving only the thin surface of the steel at the extreme point. When worn out, the steel is easily replaced.

Having thus described my invention, what I claim as new is—

A cultivator-tooth having its blade A made in the form of an equilateral triangle, broadest at its point and tapering back to the shank, and constructed with a convex cutting-edge, as shown and described, and for the purpose specified.

In witness whereof I have hereunto signed my name in the presence of two subscribing witnesses.

JOSEPH R. COLT.

Witnesses:
 ARTHUR H. PHIPANY,
 C. E. THURBER.